No. 698,681. Patented Apr. 29, 1902.
T. DUNCAN.
ELECTRICAL MEASURING INSTRUMENT.
(Application filed Jan. 2, 1900. Renewed Jan. 6, 1902.)
(No Model.) 2 Sheets—Sheet 1.
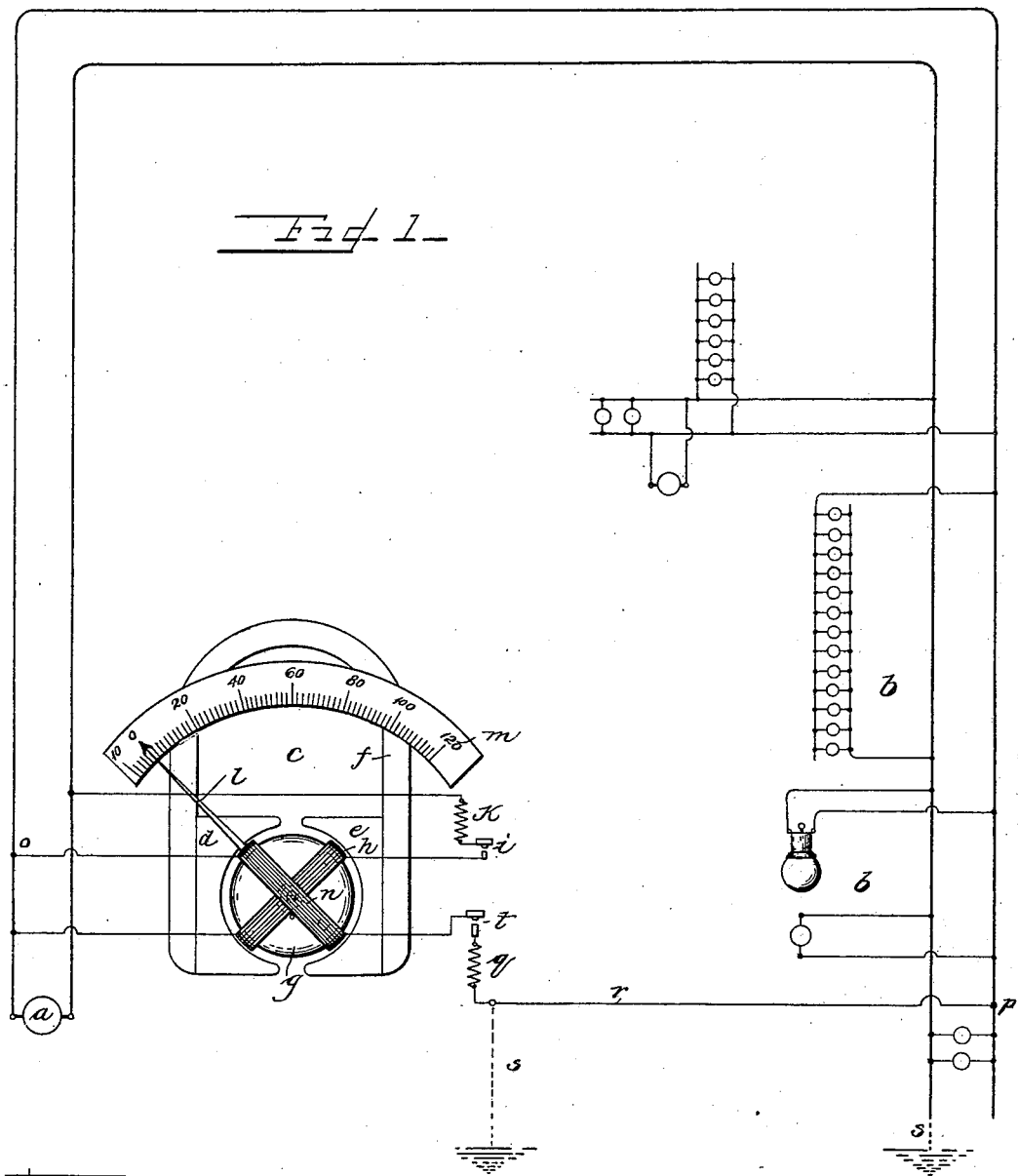
Witnesses
May Label.
C. J. Schmitt.
Inventor
Thomas Duncan
By Charles A. Brown & Cragg
Attorneys No. 698,681. Patented Apr. 29, 1902.
T. DUNCAN.
ELECTRICAL MEASURING INSTRUMENT.
(Application filed Jan. 2, 1900. Renewed Jan. 6, 1902.)
(No Model.) 2 Sheets—Sheet 2.
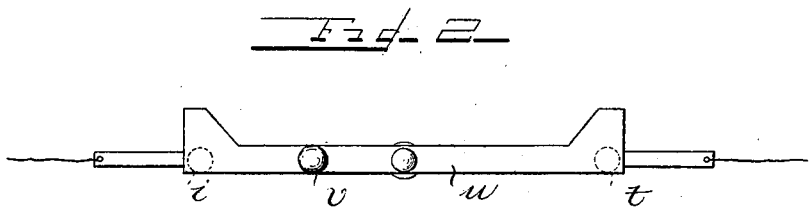
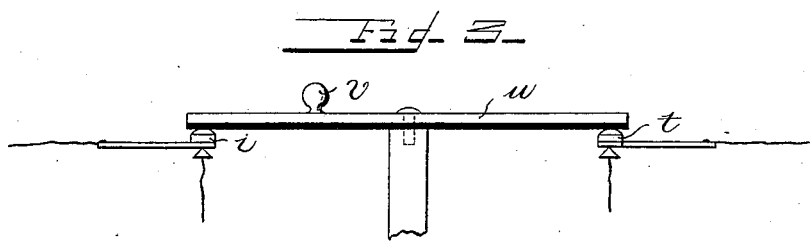
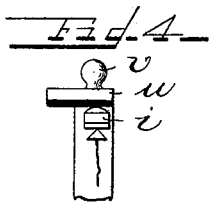

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,681, dated April 29, 1902.

Application filed January 2, 1900. Renewed January 6, 1902. Serial No. 88,489. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 343,) of which the following is a full, clear, concise, and exact description, reference being had to the accompanying drawings, forming a part of this specification.

My invention relates to voltmeters, and has for its object to provide an instrument that will measure the pressure across the generator-terminals, the drop in pressure or the $c\,r$ drop over a service or transmission conductor, and the pressure at any predetermined point in the transmission-circuit—as the center of distribution, for example.

When the pressure at any point distant from the generating-station is accurately determined, this pressure may be maintained constant by regulation of the impressed pressure to compensate for load changes and the C R drop over the distributing-lines due thereto, which varies directly as the load.

Two ways have hitherto been frequently practiced for measuring the pressure at a predetermined point in the line distant from the generating-station. A common way is to employ an ordinary voltmeter upon the station-switchboard which is connected at a distant point—as, for example, the center of distribution—by means of two pressure-wires, the instrument then indicating the pressure at the distant point. When the distance between the distant predetermined point of the line and the generating-station is great, the expense of these pressure-wires is significant when a great number of machines are used. It has also been the practice to employ what are termed "compound compensating voltmeters" containing two windings, one a pressure-winding connected between the generator-terminals and the other a counter compounding or demagnetizing winding comprising one or more turns of the series or main conductor upon the same voltmeter-spool with the shunt-winding, the current increasing the counter magnetizing effect of the series winding as the load increases to give a resultant magnetizing effect which indicates the "pressure reduction" in the transmission-line. The number of turns of the current or series winding is dependent upon the percentage of drop in the mains. This latter method, however, is objectionable, since a true compensation is not always effected in the meter for the C R drop, since the counter magnetizing effect of the series winding would be the same irrespective of the distance of the load from the generator.

In my application Serial No. 87, filed of even date herewith, I have disclosed an apparatus for accurately measuring the pressure at a distant point in which a pointer and a scale were associated with each of the windings, whereby the C R drop and the pressure at the generator-terminals could be separately measured. With the apparatus disclosed in the said application in order to ascertain the difference in potential at the predetermined distant point twice the C R drop in one transmission-conductor or a portion thereof was subtracted from the indicated pressure at the generator-terminals, the portion of the apparatus for measuring the $c\,r$ drop in one transmission-line or portion thereof being so calibrated as to indicate directly the total C R drop, so that it was only necessary to take the difference between the amounts to determine the pressure at the predetermined distant point.

In my application Serial No. 88, filed of even date herewith, I have shown an instrument capable of giving the pressure at any predetermined point of a transmission-line in a single reading.

To effect this result, I preferably caused said windings to effect a single movement proportional to the pressure at the said distant point of the system, the said windings jointly creating a single torque and being mounted upon a common oscillating shaft having a pointer movable therewith, which was adapted to indicate the movement of the shaft upon a suitable measuring-scale. The resultant of the said torques was proportional to the algebraic sum of the pressure across the generator-terminals and the C R drop, the torques due to the meter-windings acting in opposite directions. By means of my present invention I am enabled to measure the pressure at the generator-terminals, the pressure at a distant point in the transmission system, and the C R drop, although an instrument may be constructed embodying features of my invention which may be limited to the measurement of a lesser number of load conditions.

In practicing my invention I preferably construct the meter somewhat similarly to that disclosed in my last aforesaid application, and in order to carry out the objects of the present invention I provide means whereby there may be an independent action of one or either winding irrespective of the other. I preferably employ switching mechanism to control the action of either or both windings with the transmission-circuit.

I will describe my invention more particularly by reference to the accompanying drawings, in which—

Figure 1 diagrammatically illustrates an instrument constructed in accordance with my invention and a system of distribution with which the said instrument is connected. Fig. 2 is a plan view of a single key-actuating device by the actuation whereof either one of two keys, or both, may be actuated. Fig. 3 is a longitudinal elevation of the device shown in Fig. 2. Fig. 4 is an end elevation thereof.

Like parts are indicated by similar letters of reference in all of the views.

I have indicated a system for distributing direct current, a source of direct current $a$ being shown as supplying current to translating devices $b$. The instrument $c$ may be constructed as shown, two field-poles $d\ e$ of soft iron being preferably provided, a permanent horseshoe-magnet $f$ being preferably employed, upon the ends of which the said pole-pieces are secured. An iron core $g$, which is preferably stationary, is disposed between the poles. A coil $h$ of fine wire, mounted upon a rotatable shaft, surrounds the iron core and is disposed between the pole-pieces, this coil being adapted for inclusion in circuit between the generator-terminals, preferably by means of a key $i$, normally maintaining the conductor including the said coil open, a resistance $k$, extraneous to the said coil, being adapted for inclusion in the same cross-conductor with said coil or winding to prevent waste of current through said coil. A torque is thus produced proportional to the pressure impressed by the generator upon the transmission-mains. Torsional springs may be provided in the well-known way to oppose this torque.

I have shown a pointer $l$, mounted to swing with the coil, and a scale $m$, upon which the movements may be read. A second coil $n$ is mechanically coupled with the aforesaid coil, the latter coil being preferably mounted upon the same shaft with the coil $h$. The coil $n$ may be included between the separated points $o$ and $p$, in this instance the generator-terminal and a distant point of the distribution system, respectively, an extraneous resistance $q$ being preferably adapted for inclusion in the same circuit with the said coil. I have shown a metallic pressure-conductor $r$ for connecting the points $o$ and $p$. A part of this pressure-conductor may be replaced by the ground connections $s$.

I preferably employ a key or switch $t$ for opening and closing the circuit including the coil $n$. The point $p$ may be at the center of distribution or at the extreme end of the system of distribution, or a point between the extreme end and the center of distribution, or at any other point distant from the generating-station where it is desired to ascertain the pressure.

The winding $h$ may, for example, exert a torque which will rotate the pointer $l$ in a clockwise direction when the key $i$ is closed. The coil $n$ causes a torque to effect the movement of the pointer in an opposite direction. The pointer is shown as resting at zero. To ascertain the generator-pressure, the key $i$ is closed, the pointer swinging to the right to effect the indication, the key $t$ being open. To measure the C R drop, the key $i$ is released and the key $t$ closed to effect the desired measurement, the pointer moving in the reversed direction. If it should be desired to ascertain the pressure at the point $p$, both keys $i$ and $t$ are closed, the coil $n$ creating a torque in opposition to that produced by the coil $h$, assuming that there is a load upon the system.

I preferably so adjust the windings of the instrument that the winding receiving its current from conductor $r$ will produce relatively twice the torque for a given pressure impressed at its terminals than that caused by the winding subjected to the generator-pressure.

In Figs. 2, 3, and 4 I have shown a device by which either or both of the keys may be operated. The device consists of a centrally-pivoted bar $u$, carrying a handle $v$, by which it may be rotated. The ends of the bar are enlarged laterally, the lateral enlargements extending from one longitudinal end of the bar. When the bar occupies a central position, both keys will be depressed. When the bar is swung from its central position, one key or the other will be depressed, according to the direction of rotation, while the remaining key will be released. This device does not form a part of my present invention.

By means of the apparatus of my present invention I am enabled to determine the total energy given out by the generator, which is the product of the current times the reading at the scale $m$ when the key $i$ is alone closed and the energy consumed in the line or main leads, which will be the product of the current times the reading at the scale $m$ when the key $t$ is alone closed, or $C^2$ R. The difference between these two products will indicate the amount of energy available for the translating devices. The resistance of the transmission mains or leads may also be ascertained by dividing the drop in volts determined by the instrument when the key $t$ is alone closed by the current in amperes—i. e., $\frac{CR}{C}=r$.

In some of the claims I speak of the windings of the meter as being included in the transmission-circuit, and while I have specifically disclosed the application of my invention to a direct-current system of electrical distribution I do not wish to be limited to conductive connections of the meter-windings with the transmission-circuit.

While I have herein shown and particularly described one embodiment of my invention, it is obvious that changes may readily be effected without departing from the spirit thereof, and I do not, therefore, wish to be limited to the precise construction shown; but,

Having thus described my invention, I claim as new and desire to secure by Letters Patent—

1. In a system of electrical distribution, the combination with a voltmeter provided with a single measuring element, of means for including the said meter in circuit to measure the pressure across the generator and to measure the $c\,r$ drop in the line, substantially as described.

2. In a system of electrical distribution, the combination with a voltmeter provided with a single measuring element, of means for including the meter in circuit to measure the pressure across the generator-terminals and to measure the pressure at a point in the transmission system distant from the generator, substantially as described.

3. In a system of electrical distribution, the combination with a voltmeter provided with a single measuring element, of means for including the meter in circuit to measure the $c\,r$ drop in the line and to measure the pressure at a point in the transmission system distant from the generator, substantially as described.

4. In a system of electrical distribution, the combination with a voltmeter provided with a single measuring element, of means for including said meter in circuit to measure the pressure across the generator, the pressure at a point distant from the generator, and the $c\,r$ drop in the line, substantially as described.

5. In a system of electrical distribution, the combination with a voltmeter associated therewith and provided with a single measuring element, a meter-winding for determining the pressure at the generator-terminals, and a second meter-winding for determining the $c\,r$ drop in the line, of means for rendering a meter-winding active or inactive, substantially as described.

6. In a system of electrical distribution, the combination with a voltmeter associated therewith and provided with a single measuring element, a meter-winding for determining the pressure at the generator-terminals, and a second meter-winding for determining the $c\,r$ drop in the line, of means for rendering each meter-winding active or inactive, substantially as described.

7. In a system of electrical distribution, the combination with a voltmeter associated therewith and provided with a single measuring element, a meter-winding for determining the pressure at the generator-terminals, and a second meter-winding for determining the $c\,r$ drop in the line, of means for rendering each meter-winding active or inactive and for rendering both of said meter-windings simultaneously active to determine the pressure at a point of the transmission-circuit distant from the generator, substantially as described.

8. In a system of electrical distribution, the combination of a voltmeter therewith, provided with a single measuring element and two pressure-windings, one for connection between the generator-terminals to determine the generator-pressure, and the other for connection between a point at the generator and a distant point of the transmission-line to determine the $c\,r$ drop in the line, substantially as described.

9. In a system of electrical distribution, the combination with a voltmeter provided with a single measuring element and two pressure-windings, one for inclusion in circuit to determine the generator-pressure and the second for inclusion in circuit between a point near the generator and a distant point of the transmission-line, of means for switching a winding into and out of circuit, substantially as described.

10. In a system of electrical distribution, the combination with a voltmeter provided with a single measuring element and two pressure-windings, one for inclusion in circuit to determine the generator-pressure, and the second for inclusion in circuit between a point near the generator and a distant point of the transmission-line, of means for switching either winding into and out of circuit to determine either the generator-pressure or $c\,r$ drop and for switching both windings into circuit at the same time to determine the pressure at said distant point, substantially as described.

11. In a system of electrical distribution, the combination of a voltmeter therewith provided with a single measuring element and two pressure-windings, one for connection between the generator-terminals to determine the generator-pressure and the other for connection between a point at the generator and a distant point of the transmission-line to determine the $c\,r$ drop in the line, and a rotatable shaft upon which said windings are mounted, substantially as described.

12. In a system of electrical distribution, the combination with a voltmeter provided with a single measuring element and two pressure-windings, one for inclusion in circuit to determine the generator-pressure and the second for inclusion in circuit between a point near the generator and a distant point of the transmission-line, of means for switching a winding into and out of circuit, and a rotatable shaft upon which said windings are mounted, substantially as described.

13. In a system of electrical distribution, the combination with a voltmeter provided with a single measuring element and two pressure-windings, one for inclusion in circuit to determine the generator-pressure and the second for inclusion in circuit between a point near the generator and a distant point of the transmission-line, of means for switching either winding into and out of circuit to determine either the generator-pressure or $c\,r$ drop, and for switching both windings into circuit at the same time to determine the pressure at said distant point, and a rotatable shaft upon which said windings are mounted, substantially as described.

14. In a system of electrical distribution, the combination of a voltmeter therewith provided with a single measuring element and two windings, one for connection between the generator-terminals to determine the generator-pressure, and the other for connection between a point at the generator and a distant point of the transmission-line to determine the $c\,r$ drop in the line, the said windings serving to create opposing torques, substantially as described.

15. In a system of electrical distribution, the combination with a voltmeter provided with a single measuring element and two pressure-windings, one for inclusion in circuit to determine the generator-pressure and the second for inclusion in circuit between a point near the generator and a distant point of the transmission-line, of means for switching a winding into and out of circuit, said windings serving to create opposing torques, substantially as described.

16. In a system of electrical distribution, the combination with a voltmeter provided with a single measuring element and two pressure-windings, one for inclusion in circuit to determine the generator-pressure and the second for inclusion in circuit between a point near the generator and a distant point of the transmission-line, of means for switching a winding into and out of circuit, said windings serving to create opposing torques, substantially as described.

17. In a direct-current system of electrical distribution, the combination with a direct-current generator supplying the system of distribution, of a voltmeter provided with a single measuring element, and means for connecting the said meter conductively in circuit to measure the pressure across the generator and to measure the $c\,r$ drop in the line, substantially as described.

18. In a direct-current system of electrical distribution, the combination with a direct-current generator supplying the system of distribution, of a voltmeter provided with a single measuring element, and means for connecting the meter conductively in circuit to measure the pressure across the generator-terminals and to measure the pressure at a point in the transmission system distant from the generator, substantially as described.

19. In a direct-current system of electrical distribution, the combination with a direct-current generator supplying the system of distribution, of a voltmeter provided with a single measuring element, and means for connecting the meter conductively in circuit to measure the $c\,r$ drop in the line and to measure the pressure at a point in the transmission system distant from the generator, substantially as described.

20. In a direct-current system of electrical distribution, the combination with a direct-current generator supplying the system of distribution, of a voltmeter provided with a single measuring element, and means for connecting said meter conductively in circuit to measure the pressure across the generator, the pressure at a distant point from the generator and the $c\,r$ drop in the line, substantially as described.

In witness whereof I hereunto subscribe my name this 20th day of December, A. D. 1899.

THOMAS DUNCAN.

Witnesses:
WILLIAM F. MEYER,
JAMES W. DALTON.